(12) United States Patent
Shakudo et al.

(10) Patent No.: US 10,890,475 B2
(45) Date of Patent: Jan. 12, 2021

(54) DIAGNOSTIC SYSTEM, DIAGNOSTIC METHOD, DIAGNOSTIC PROGRAM, AND FLOW RATE CONTROLLER

(71) Applicant: HORIBA STEC, Co., Ltd., Kyoto (JP)

(72) Inventors: Kazuya Shakudo, Kyoto (JP); Kentaro Nagai, Kyoto (JP); Kazuhiro Matsuura, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 320 days.

(21) Appl. No.: 15/918,871

(22) Filed: Mar. 12, 2018

(65) Prior Publication Data
US 2018/0266865 A1    Sep. 20, 2018

(30) Foreign Application Priority Data

Mar. 14, 2017   (JP) ................................. 2017-049248
Jan. 18, 2018   (JP) ................................. 2018-006632

(51) Int. Cl.
*G01F 7/00*     (2006.01)
*G01F 1/88*     (2006.01)
*G01F 25/00*    (2006.01)

(52) U.S. Cl.
CPC ................ *G01F 7/005* (2013.01); *G01F 1/88* (2013.01); *G01F 25/0007* (2013.01)

(58) Field of Classification Search
CPC ..................................... G01F 7/005; G01F 1/88
See application file for complete search history.

(56) References Cited

U.S. PATENT DOCUMENTS 5,062,446 A * 11/1991 Anderson ............ G05D 7/0635
                                                     137/468
8,744,784 B2 * 6/2014 Yasuda ..................... G01F 1/50
                                                      702/100
(Continued)

FOREIGN PATENT DOCUMENTS

CN    101529356 A    9/2009
CN    102445939 A    5/2012
(Continued)

OTHER PUBLICATIONS

China National Intellectual Property Administration, Office Action and Search Report Issued in Application No. 201810204147.0, dated Jul. 24, 2020, 19 pages.

*Primary Examiner* — Jennifer E Simmons
(74) *Attorney, Agent, or Firm* — Alleman Hall Creasman & Tuttle LLP

(57) ABSTRACT

The present invention intends to more accurately diagnose a function of a flow rate sensor regardless of a variation in measurement ambient condition. The present invention includes: a flow rate sensor for measuring the flow rate of fluid; a correction part adapted to measure an output value of the flow rate sensor or a value related to the output value (hereinafter collectively referred to as an "output-related value"), relates the measured output-related value and a corresponding measurement ambient condition to each other, and in accordance with the measurement ambient condition in measurement data, correct the output-related value or a reference value that is predetermined in order to determine whether the output-related value is normal; and a diagnostic part adapted to compare the output-related value and the reference value on the basis of a correction result by the correction part and correct the function of the flow rate sensor.

9 Claims, 9 Drawing Sheets

(56) References Cited

U.S. PATENT DOCUMENTS

2010/0070240 A1     3/2010   Yasuda et al.
2012/0080104 A1*   4/2012   Yamaguchi ........... G01F 1/6847
                                                                                     137/559
2019/0204128 A1*   7/2019   Somani ..................... G01F 1/88

FOREIGN PATENT DOCUMENTS

| CN | 102483344 A | 5/2012 |
| CN | 104040300 A | 9/2014 |
| JP | 4881391 B | 12/2011 |
| WO | 2011011255 A2 | 1/2011 |

\* cited by examiner

DIAGNOSTIC SYSTEM, DIAGNOSTIC METHOD, DIAGNOSTIC PROGRAM, AND FLOW RATE CONTROLLER

TECHNICAL FIELD

The present invention relates to a diagnostic system, diagnostic method, diagnostic program, and flow rate controller.

BACKGROUND ART

As a diagnostic mechanism used for a flow rate controller (mass flow controller), Patent Literature 1 discloses one that includes: a resistor for generating a differential pressure in a flow path through which fluid flows; a flow rate sensor having pressure sensors respectively provided on the upstream side and the downstream side of the resistor; and a valve for opening/closing the flow path on the upstream side of the flow rate sensor. In addition, the diagnostic mechanism disclosed in Patent Literature 1 is adapted to depressurize the flow path with the flow path closed by the valve, and diagnose a function of the flow rate sensor on the basis of whether an output value obtained from the flow rate sensor in the depressurized state or an output-related value (diagnostic parameter) that is a value related to the output value is different from a predetermined reference value.

More specifically describing the output-related value here, the output-related value is obtained in accordance with the following procedure. First, the flow path is depressurized in the state of being closed by the valve, and then using Expression (1), a mass flow rate Q is calculated from the differential pressure between pressures P1 and P2 measured by both the pressure sensors.

$$Q = (P1^2 - P2^2)X \quad (1)$$

Here, P1 represents the pressure value of the upstream side pressure sensor, P2 the pressure value of the downstream side pressure sensor, and X a coefficient that changes depending on a gas species.

Then, using Expression (2), the mass flow rate Q is time-integrated for a predetermined time during which the pressure measured by the upstream side pressure sensor temporally changes, and thereby a mass flow rate integrated value n is calculated. Note that in FIG. 5, the sum of mass flow rates Q in the hatched area between a and b represents the mass flow rate integrated value n.

$$n = \int_a^b Q\,dt \quad (2)$$

The mass flow rate integrated value n can also be expressed as Expression (3) based on the gas state equation.

$$n = P1_{START} V/RT - P1_{END}/RT \quad (3)$$

Here, V represents a volume value for diagnosis, $P1_{START}$ the pressure measured by the upstream side pressure sensor at the start of the predetermined time, and $P1_{END}$ the pressure measured by the upstream side pressure sensor at the end of the predetermined time.

Finally, the volume value V expressed by Expression (4) derived from Expressions (2) and (3) is the output-related value.

$$\int_a^b Q\,dt = P1_{START} V/RT - P1_{END} V/RT$$
$$= V/RT(P1_{START} - P1_{END})$$
$$= \Delta P1 V/RT$$

$$\therefore V = \frac{RT}{\Delta P1} \int_a^b Q\,dt \quad (4)$$

Here, n represents a molar number (a number obtained by time-integrating mass per unit time (mass flow rate Q) calculated using Expression (1), i.e., the mass flow rate integrated value n), R the gas constant determined depending on a gas species, T the temperature measured by the temperature sensor and considered constant here, and $\Delta P1$ the pressure difference between the pressures measured by the upstream side pressure sensor at the start and end of the predetermined time.

Note that Expressions (3) and (4) include the temperature difference and pressure difference between the start and end of the predetermined time; however, these values may be the amounts of changes in pressure and temperature taking account of changes in pressure and temperature during the predetermined time.

Meanwhile, the output-related value expressed by Expression (4) includes the temperature and the pressures, and the values of them act as factors causing an error in the volume value V. That is, when attempting to continuously measure the temporally changing pressure using the pressure sensor, secondary pressure caused by factors such as a pipe and various devices connected on the downstream side of the flow rate sensor changes as time passes, and the change in secondary pressure affect the measurement of the pressure by the pressure sensor. That is, the pressure cannot be measured under the same measurement ambient condition, and therefore an error occurs in the volume value V due to the change in the secondary pressure. In addition, the temperature also changes as time passes, and the change in the temperature affects the measurement of the pressure by the pressure sensor, so that the pressure cannot be measured under the same measurement ambient condition, and therefore an error occurs in the volume value V due to the change in the temperature.

Accordingly, when attempting to diagnose the flow rate sensor on the basis of the output-related value expressed by Expression (4), an error occurs in the output-related value, thus causing the problem that accurate diagnosis cannot be performed.

CITATION LIST

Patent Literatures

Patent Literature 1: Japanese Patent No. 4881391

SUMMARY OF INVENTION

Technical Problem

Therefore, a main object of the present invention is to, regardless of a change in measurement ambient condition, accurately diagnose a function of a flow rate sensor and reduce the likelihood of misdiagnosis.

Solution to Problem

That is, a diagnosis system according to the present invention includes: an output-related value measurement part adapted to measure an output value of a fluid sensor or an output-related value that is any value of values related to the output value; a reference value storage part adapted to store a reference value that is predetermined in order to determine whether the output-related value is normal; a correction part adapted to correct at least one of the output-related value and the reference value in accordance with a measurement ambient condition for the output-related value; and a diagnostic part adapted to diagnose the fluid sensor on the basis of the output-related value and the reference value at least one of which is reflected with a correction result by the correction part.

Since the diagnostic system as described above corrects the output-related value or the reference value in accordance with the measurement ambient condition such as the pressure or temperature of fluid causing an error in the output-related value, and diagnoses the fluid sensor on the basis of the output-related value and the reference value at least one of which is reflected with the result of the correction, a function of the fluid sensor can be more accurately diagnosed to improve diagnostic accuracy, and correspondingly, the likelihood of misdiagnosis can be reduced. Note that the output-related value is a concept including the output value of the fluid sensor and the values related to the output value. When the fluid sensor is a flow rate sensor, a flow rate value that is an output value of the flow rate sensor, and values related to the flow rate value, such as a volume value, are included. In addition, specifically, when the correction part corrects only the output-related value, the diagnostic part diagnoses the fluid sensor on the basis of the corrected output-related value and the uncorrected reference value; when the correction part corrects only the reference value, the diagnostic part diagnoses the fluid sensor on the basis of the uncorrected output-related value and the corrected reference value; and when the correction part corrects the output-related value and the reference value, the diagnostic part diagnoses the fluid sensor on the basis of the corrected output-related value and the corrected reference value.

Also, the diagnostic system may further include a reference output-related value storage part adapted to store a reference output-related value preliminarily measured under a measurement ambient condition serving as a reference and the measurement ambient condition in relation to each other, and the correction part may be one that corrects the output-related value or the reference value on the basis of the deviation between the measurement ambient condition related to the output-related value and the measurement ambient condition related to the reference output-related value.

The diagnostic system as described above can measure the reference output-related value serving as a reference for the reference value, as well as the output-related value, and when setting the reference value, it is not necessary to add a new sensor or the like, thus making it possible to simplify the system as well as to reduce cost.

Further, in any of the above diagnostic systems, the measurement ambient condition may include any of the pressure and temperature of the fluid. Note that as the pressure of the fluid, primary pressure or secondary pressure caused by the effects of a pipe and external devices connected to the fluid sensor can be cited. Also, as the temperature of the fluid, temperature affecting measurement by each sensor such as a pressure sensor can be cited.

Further, the output-related value may be a value based on a time integrated value of temporally changing pressure of the fluid. Specifically, the output-related value may be a value based on a mass flow rate integrated value obtained by, for a predetermined time, integrating a mass flow rate calculated on the basis of a differential pressure generated between upper and lower streams of the fluid. More specifically, the output-related value may be a volume value of the fluid, which is calculated from a pressure and temperature change amounts during the predetermined time at the upper or lower stream and from the mass flow rate integrated value.

Such an output-related value makes it possible to reduce the effect of noise thereon because when the temporally changing pressure is continuously measured, even when a part of the resulting pressure values has a peak dip noise, the time integrated value of the noise is very small, and therefore diagnostic accuracy can be improved. Also, in the case of a differential pressure mass flow controller, values for calculating the output related value can be measured by respective sensors originally provided therein, and therefore the fluid sensor can be accurately diagnosed without separately adding a sensor or the like.

Further, any of the above diagnostic system may further include a flow rate adjustment mechanism adapted to block a flow of the fluid, and the flow rate adjustment mechanism may be one that blocks the flow of the fluid to thereby temporally change the pressure of the fluid on an upstream side or a downstream side. In addition, the fluid sensor may be one including a resistor for generating the differential pressure between the upper and lower streams of the fluid.

Note that the term "flow rate adjustment mechanism" does not refer to only a flow rate control mechanism constituting a flow rate controller such as a differential pressure mass flow controller or a thermal mass flow controller, but include, for example, a device like an on-off valve provided, separately from a mass flow controller, in a pipe extending from an introduction port or lead-out port of the mass flow controller. That is, it is only necessary to be one capable of opening/closing a flow path for the fluid.

In such a configuration, the function of the fluid sensor is diagnosed using the temporally change of the pressure in the very small flow path volume between the flow rate adjustment mechanism and the resistor, and therefore a depressurization time can be shortened to shorten a time necessary for the diagnosis. Also, in the case of a differential pressure mass flow controller, the flow rate sensor can be diagnosed using an originally equipped mechanism.

In addition, a fluid sensor diagnostic method according to the present invention is one adapted to measure an output value of a fluid sensor or an output-related value that is any value of values related to the output value; in accordance with a measurement ambient condition for the output-related value, correct at least one of the output-related value and a reference value that is predetermined in order to determine whether the output-related value is normal; and diagnose the fluid sensor on the basis of the output-related value and the reference value at least one of which is reflected with a result of the correction.

Further, a program according to the present invention is one used for a diagnostic system adapted to diagnose a function of a fluid sensor for measuring fluid, and the program instructs a computer to fulfill functions of: measuring an output value of the fluid sensor or an output-related value that is any value of values related to the output value; in accordance with a measurement ambient condition for the output-related value, correcting at least one of the output-related value and a reference value that is predetermined in order to determine whether the output-related value is normal; and diagnosing the fluid sensor on the basis of the output-related value and the reference value at least one of which is reflected with a result of the correction.

Still further, a flow rate controller according to the present invention includes: a flow rate sensor for measuring a flow rate of fluid; a flow rate control mechanism provided on the upstream side of the flow rate sensor and adapted to control the flow rate of the fluid on the basis an output value of the flow rate sensor; an output-related value measurement part adapted to measure the output value of the fluid sensor or an output-related value that is any value of values related to the output value; a reference value storage part adapted to store a reference value that is predetermined in order to determine whether the output-related value is normal; a correction part adapted to correct at least one of the output-related value and the reference value in accordance with a measurement ambient condition for the output-related value; and a diagnostic part adapted to diagnose the fluid sensor on the basis of the output-related value and the reference value at least one of which is reflected with a correction result by the correction part.

Advantageous Effects of Invention

According to the present invention configured as described above, since the output-related value is diagnosed in accordance with the measurement ambient condition causing an error in the output-related value, the function of the fluid sensor can be more accurately diagnosed and the likelihood of misdiagnosis can be reduced.

DESCRIPTION OF EMBODIMENTS

In the following, the diagnostic system according to the present invention will be described with reference to the drawings.

The diagnostic system according to the present invention is one adapted to diagnose a function of a fluid sensor and incorporated in, for example, a flow rate measurement device or a flow rate controller (mass flow controller) including a flow rate sensor. Specific examples of the flow rate controller include, for example, a differential pressure mass flow controller, a thermal mass flow controller, and the like.

First Embodiment

Figure 1:
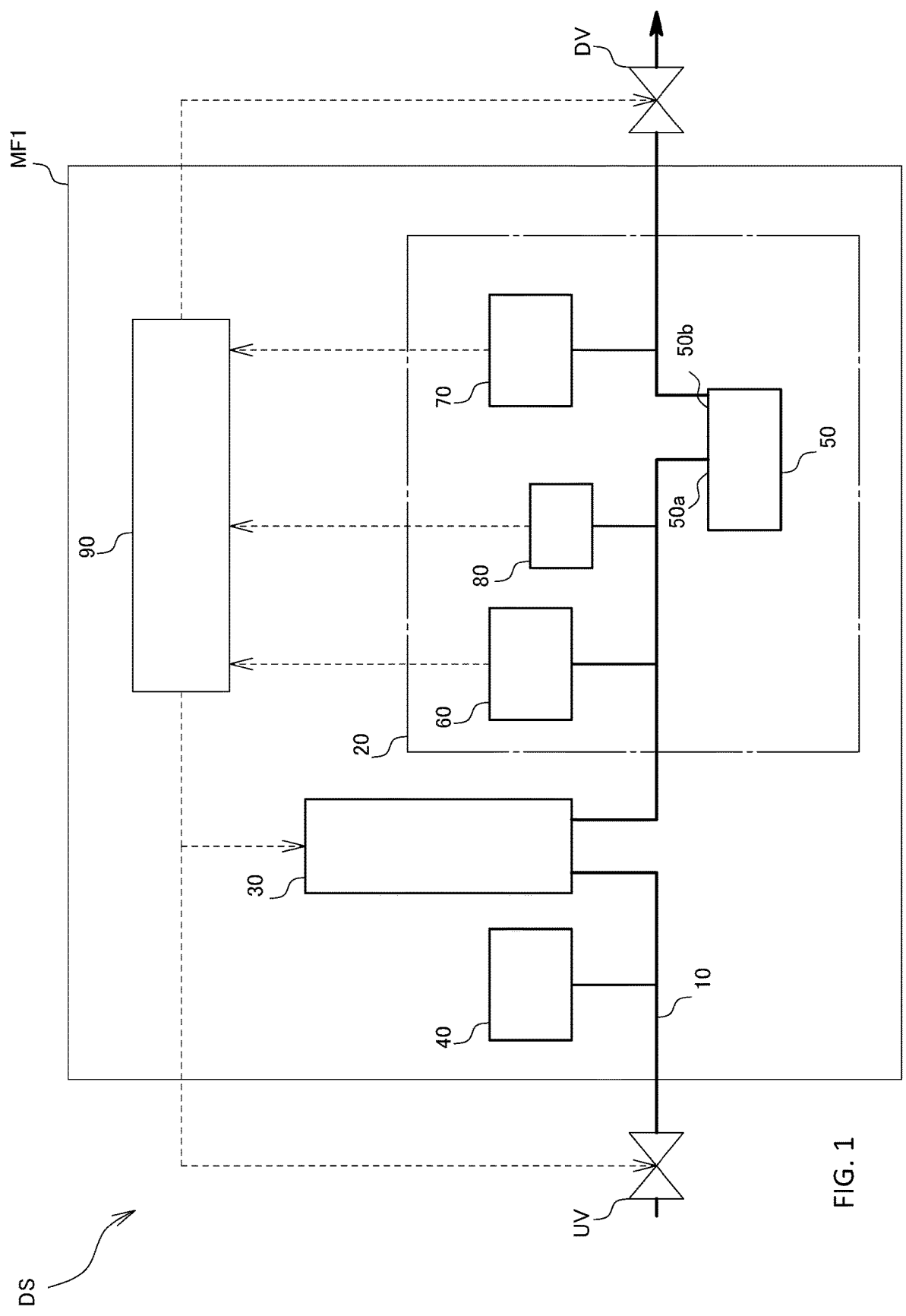
FIG. 1 is a schematic view illustrating a flow rate controller according to a first embodiment.

As illustrated in FIG. 1, a diagnostic system DS according to the present embodiment is one including a flow rate controller MF1, and on-off valves UV and DV respectively provided on the upstream side and the downstream side of the flow rate controller MF1, and used for, for example, a gas control system for supplying material gas and cooling gas into a deposition chamber of a semiconductor deposition apparatus.

The flow rate controller MF1 is a differential pressure mass flow controller. Specifically, the flow rate controller MF1 includes: a flow path 10 through which fluid flows; a flow rate sensor 20 for measuring the flow rate of the fluid flowing through the flow path 10; a flow rate control mechanism 30 provided on the upstream side of the flow rate sensor 20; and a pressure sensor 40 provided on the upstream side of the flow rate control mechanism 30 and for measuring supply pressure.

Although not illustrated, the flow path 10 is provided with an introduction port on the upstream side thereof and with a lead-out port on the downstream side thereof. In addition, for example, the introduction port is connected via a pipe to a gas supply mechanism adapted to supply the gas to be introduced into the flow rate controller MF1, and the lead-out port is connected via a pipe to a deposition chamber that is a supply destination of the gas whose flow rate is controlled by the flow rate controller.

The flow rate sensor 20 includes: a resistor 50 for generating a differential pressure in the flow path 10; an upstream side pressure sensor 60 for measuring pressure on the upstream side of the resistor 50; a downstream side pressure sensor 70 for measuring pressure on the downstream side of the resistor 50; and a temperature sensor 80 for measuring temperature between the flow rate control mechanism 30 and the resistor 50. In addition, both the pressure sensors 60 and 70 are ones of an absolute pressure type.

Figure 3:
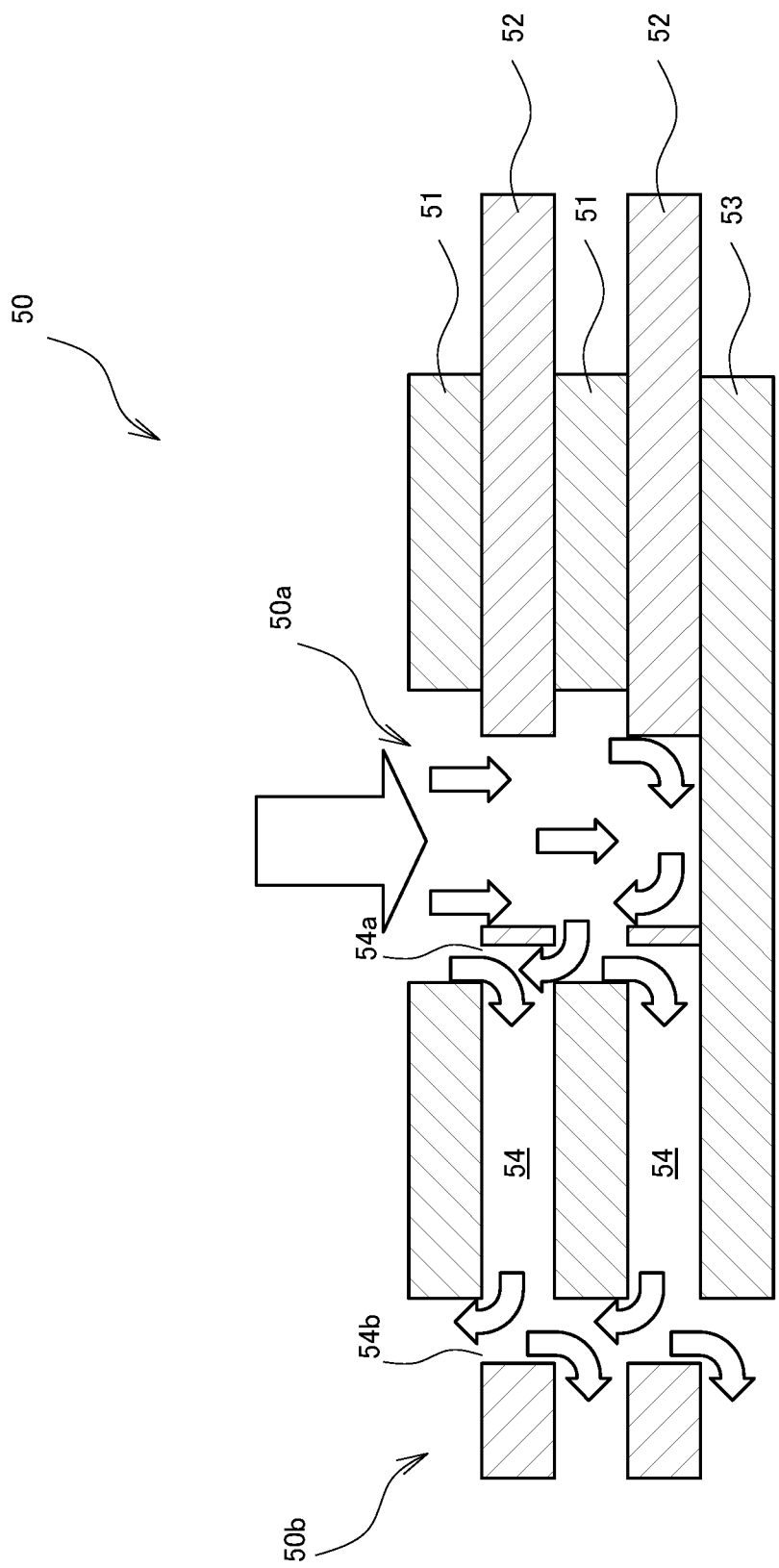
FIG. 3 is a cross-sectional view illustrating a resistor of the flow rate controller according to the first embodiment.
Figure 4:
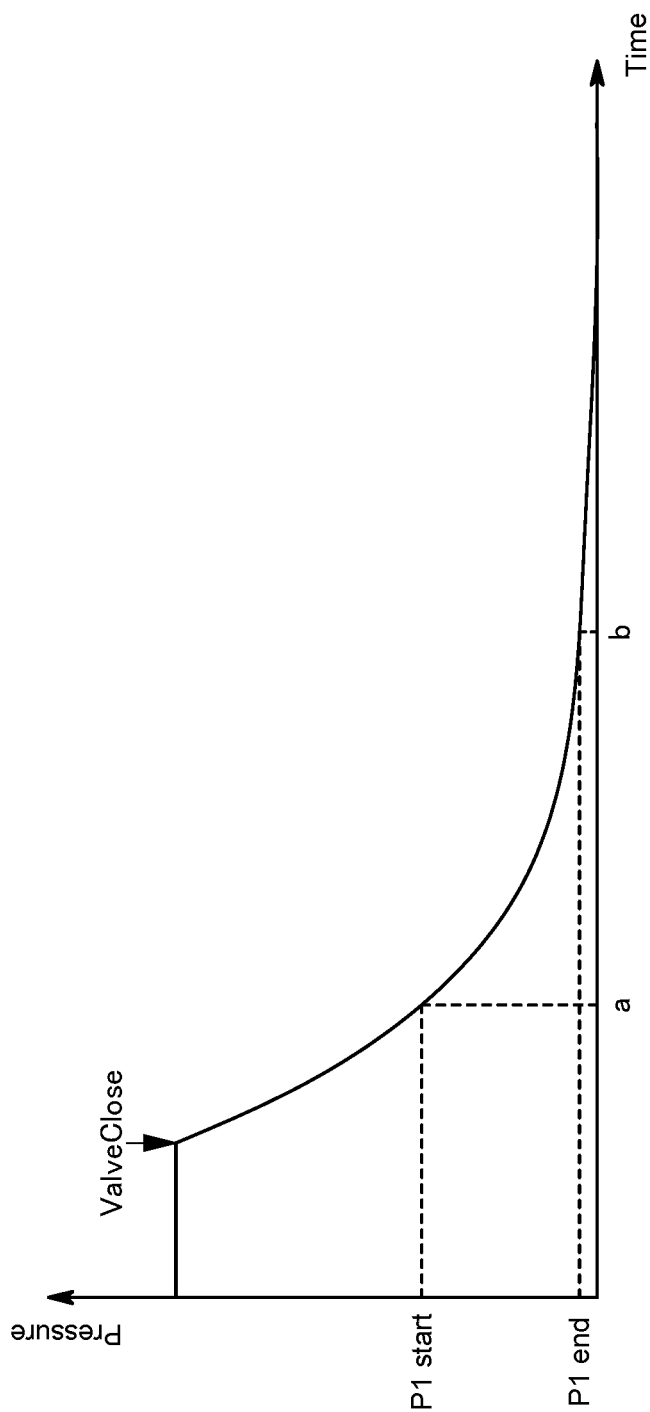
FIG. 4 is a graph illustrating a temporally change in pressure measured by an upstream side pressure sensor in the flow rate controller according to the first embodiment.
Figure 5:
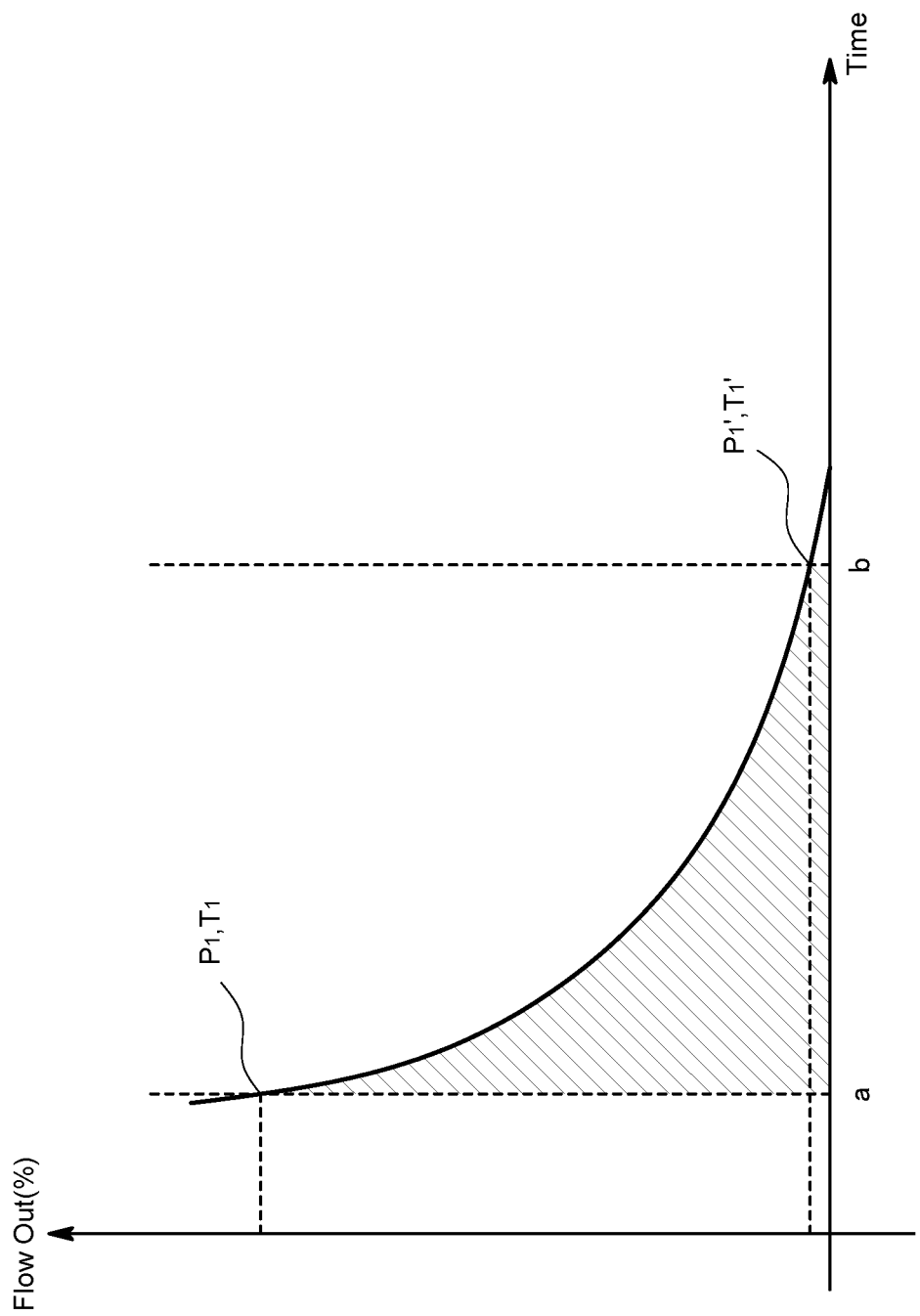
FIG. 5 is a graph for explaining a mass flow rate integrated value in the flow rate controller according to the first embodiment.

The resistor 50 is one that as illustrated in FIG. 3, generates the differential pressure between an introduction port 50a on the upstream side and a lead-out port 50b on the downstream side. In addition, specifically, the resistor 50 is configured to mainly include two types of ring bodies 51 and 52, in which the first ring bodies 51 are smaller in outside diameter and larger in inside diameter than the second ring bodies 52, and the second ring bodies 52 are larger in outside diameter and smaller in inside diameter than the first ring bodies 51. Further, both the ring bodies 51 and 52 are configured to be alternately stacked from a first ring body 51, and finally a disc body 53 is stacked thereon. In doing so, one end of a space formed in the center of a stack formed by stacking the respective ring bodies 51 and 52 is closed, and thereby the introduction port 50a is formed. Also, a second ring body 52 stacked between adjacent first ring bodies 51 includes, in a part thereof, a flow path space 54 penetrating therethrough with the inner wall and the outer wall left. In doing so, a gap formed between the inner surface of the first ring bodies 51 and the inner wall of the second ring body 52 serves as an introduction path 54a connecting to the flow path space 54, and a gap formed between the outer surfaces of the first ring bodies 51 and the outer wall of the ring body 52 serves as a lead-out path 54b connecting to the outside. In addition, the lead-out path 54b forms the lead-out port 50b. Such a configuration makes it possible to freely set the amount of the differential pressure generated between the introduction port 50a side and the lead-out port 50b side by adjusting the numbers of ring bodies 51 and 52 to be stacked and/or the size of each flow path space 54.

The flow rate control mechanism 30 is configured to be capable of adjusting a valve opening level using an actuator such as a piezo element.

Further, the flow rate controller MF1 includes a control part 90 for allowing the flow rate controller MF1 to fulfill a flow rate control function, a flow rate sensor diagnostic function, a pressure sensor diagnostic function, a flow rate control mechanism diagnostic function, and the like. The control part 90 includes a so-called computer having a CPU, a memory, A/D and D/A converters, input/output means, and the like, and makes respective devices cooperate and fulfill respective functions by executing a program stored in the memory. Note that the control part 90 is connected with unillustrated input/output means.

Figure 2:
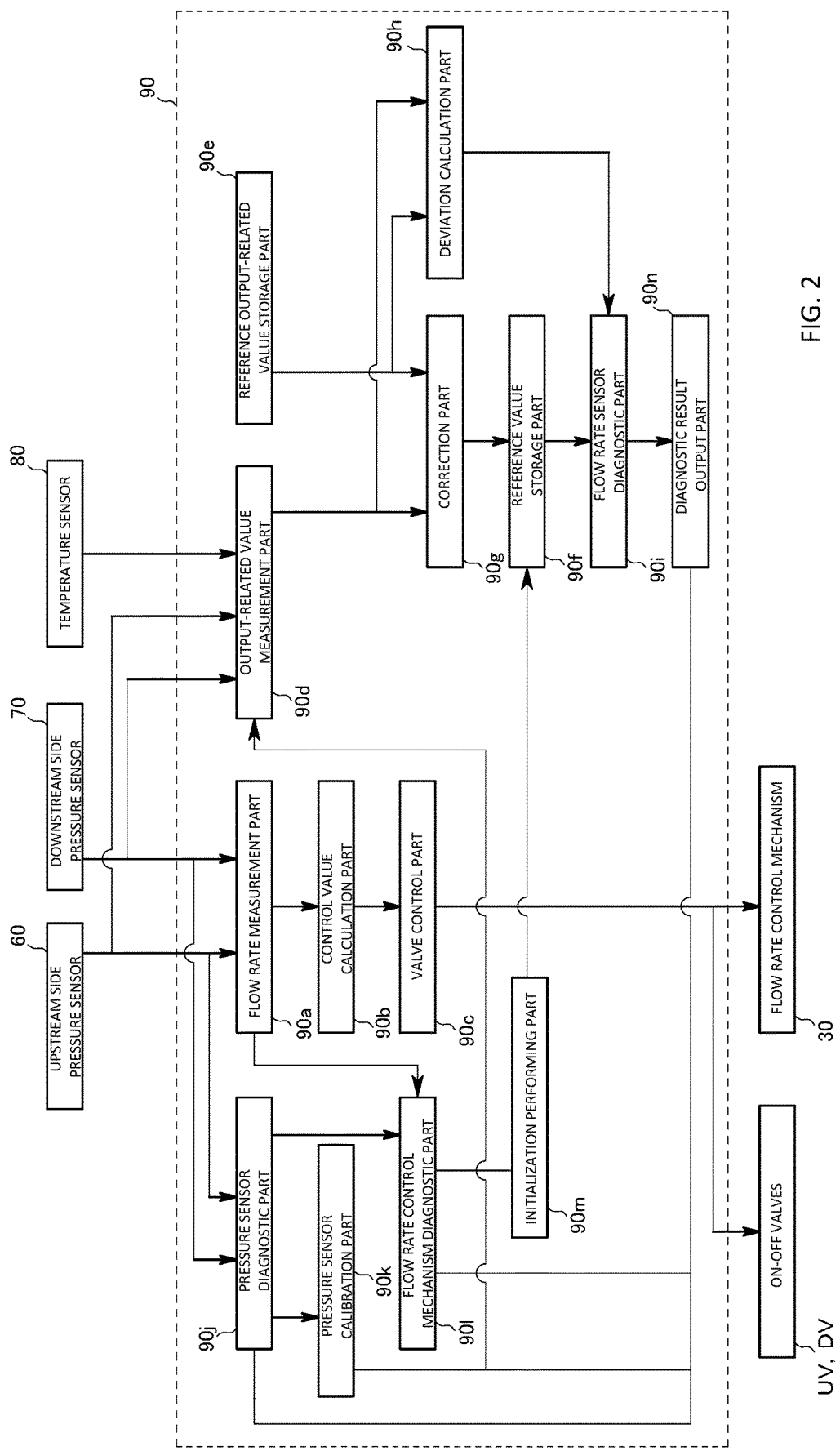
FIG. 2 is a functional configuration view illustrating a control part of the flow rate controller according to the first embodiment.

Specifically, as illustrated in FIG. 2, the control part 90 includes a flow rate measurement part 90a, a control value calculation part 90b, a valve control part 90c, an output-related value measurement part 90d, a reference output-related value storage part 90e, a reference value storage part 90f, a correction part 90g, a deviation calculation part 90h, a flow rate sensor diagnostic part 90i, a pressure sensor diagnostic part 90j, a pressure sensor calibration part 90k, a flow rate control mechanism diagnostic part 90l, an initialization performing part 90m, and a diagnostic result output part 90n.

The flow rate measurement part 90a is one adapted to calculate a flow rate value of the fluid on the basis of detected values (pressure values) detected by both the pressure sensors 60 and 70 provided in the flow rate sensor 20. In addition, the flow rate measurement part 90a is configured to receive the detected values detected by both the sensors 60 and 70 at a predetermined timing.

The control value calculation part 90b is one adapted to calculate a control value for performing the feedback control of the flow rate control mechanism 30 on the basis of the deviation between the flow rate value calculated by the flow rate measurement part 90a and a preset reference flow rate value.

The vale control part 90c is one adapted to control the opening level of a valve of the flow rate control mechanism 30 and the opening levels of the on-off valves UV and DV. Specifically, at the time of normal operation, the valve control part 90c is one adapted to, on the basis of the control value calculated by the control value calculation part 90b, perform the feedback control and thereby change the opening level of the valve of the flow rate control mechanism 30. In addition, the valve control part 90c is adapted to fully close the valve of the flow rate control mechanism 30 and also open the on-off valves UV and DV on the basis of a flow rate sensor diagnostic instruction inputted through the input/output means. Further, the valve control part 90c is adapted to fully close the on-off valve UV and also open the valve of the flow rate control mechanism 30 and the on-off valve DV on the basis of a pressure sensor diagnostic instruction inputted through the input/output means. Also, the valve control part 90c is adapted to fully close the valve of the flow rate control mechanism 30 and also open the on-off valves UV and DV on the basis of a flow rate control mechanism diagnostic instruction inputted through the input/output means.

The output-related value measurement part 90d is one adapted to calculate a volume value (output-related value) of the fluid on the basis of the detected values (pressure values and temperature value) detected by both the pressure sensors 60 and 70 and temperature sensor 80 provided in the flow rate sensor 20. Note that the output-related value measurement part 90d starts the measurement of the output-related value on the basis of the input of the flow rate sensor diagnostic instruction through the input/output means. Specifically, when the flow rate sensor diagnostic instruction is inputted through the input/output means, the valve control part 90c fully closes the valve of the flow rate control mechanism 30 and also opens the on-off valves UV and DV. As a result, the downstream side of the flow rate control mechanism 30 is started to be depressurized by an unillustrated discharge mechanism provided on the downstream side of the flow rate control mechanism 30, for example, by an evacuation pump connected to the deposition chamber. Then, by integrating the mass flow rate Q of the fluid calculated from the pressure values P1 and P2 measured by the respective pressure sensors 60 and 70 using Expression (1) above over a predetermined time, a mass flow rate integrated value n is calculated. Subsequently, using Expression (4), a measured volume value V is calculated from the pressure difference between pressures measured by the upstream side pressure sensor 60 and a temperature value T measured by the temperature sensor 80 at the start and end of the predetermined time. Note that the measured volume value V represents the volume of the flow path from the flow rate control mechanism 30 to the introduction port 50a of the resistor 50. In addition, the output-related value measurement part 90d is configured to receive the detected values detected by both pressure sensors 60 and 70 and the temperature sensor 80 at a predetermined timing.

The reference output-related vale storage part 90e is one that, before shipping the flow rate controller MF1 from a manufacturing factory, after actually connecting the flow rate controller MF1 to a semiconductor manufacturing apparatus or the like, or on other such occasions, stores reference data in which a reference volume value $V_S$ preliminarily measured under a predetermined measurement ambient condition and the measurement ambient condition are related to each other.

The reference value storage part 90f is one that stores a reference value for determining whether the measured volume value V is normal. Note that the reference value is determined on the basis of the reference volume value $V_S$. In the present embodiment, whether the measured volume value V is normal is determined by setting a threshold value for the shift ratio of the measured volume value V to the reference volume value $V_S$ and determining whether the shift ratio exceeds the threshold value. Therefore, the threshold value for the shift ratio is the reference value.

The correction part 90g is one adapted to generate measurement data, relating the measured volume value V to a measurement ambient condition at the time of the measurement of the measured volume value V, and correct the measured volume value V or the reference value on the basis of the deviation between the measurement ambient condition included in the measurement data and the measurement ambient condition included in the reference data. In the present embodiment, the correction part 90g corrects the threshold value corresponding to the upper limit value of the shift ratio of the measured volume value V to the reference volume value $V_S$.

The deviation calculation part 90h is one adapted to calculate the shift ratio of the measured volume value V to the reference volume value $V_S$.

The flow rate sensor diagnostic part 90i is one adapted to diagnose the function of the flow rate sensor 20 by, on the basis of a measured volume value V resulting from the correction by the correction part 90g and the reference value, determining whether the measured volume value V is normal.

The pressure sensor diagnostic part 90j is one adapted to diagnose whether the pressure values detected by both the pressure sensors 60 and 70 provided in the flow rate sensor 20 are within a predetermined specified pressure range. Specifically, when the pressure sensor diagnostic instruction is inputted through the input/output means, the valve control part 90c fully closes the on-off valve UV and also opens the valve of the flow rate control mechanism 30 and the on-off valve DV. As a result, the downstream side of the flow rate control mechanism 30 is started to be depressurized by the discharge mechanism provided on the downstream side of the flow rate control mechanism 30. This state is a pressure sensor diagnostic state, and in this state, the pressure sensor diagnostic part 90j diagnoses whether the pressure values detected by both the pressure sensors 60 and 70 are within the specified pressure range.

The pressure sensor calibration part 90k is one adapted to make zero-point corrections of both the pressure sensors 60 and 70 provided in the flow rate sensor 20. Specifically, when a pressure sensor calibration instruction is inputted through the input/output means in the pressure sensor diagnostic state, the pressure sensor calibration part 90k makes the zero-point corrections of both the pressure sensors 60 and 70.

The flow rate control mechanism diagnostic part 90l is one adapted to diagnose the flow rate control mechanism 30. Specifically, when the flow rate control mechanism diagnostic instruction is inputted through the input/output means, the valve control part 90c fully closes the valve of the flow rate control mechanism 30 and also opens the on-off valves UV and DV. As a result, the upstream side of the flow rate control mechanism 30 is started to be pressurized by the supply mechanism provided on the upstream side of the flow rate control mechanism 30, and also the downstream of the flow rate control mechanism 30 is started to be depressurized by the discharge mechanism provided on the downstream side of the flow rate control mechanism 30. Then, the flow rate control mechanism diagnostic part 90l diagnoses whether the increase rate of the flow rate value measured by the flow rate measurement part 90a is within a specified increase rate range.

The initialization performing part 90m is one adapted to reset the reference data stored in the reference output-related value storage part 90e. Specifically, when an initialization instruction is inputted through the input/output means, the initialization performing part 90m overwrites the reference data stored in the reference output-related value storage part 90e with new reference data in which a reference volume value $V_S'$ remeasured under another measurement ambient condition and the measurement ambient condition are related to each other, and further, on the basis of the new reference data, resets the reference value stored in the reference value storage part 90f.

The diagnostic result output part 90n is one adapted to output a diagnostic result by each diagnostic part through the input/output means as an image, sound, or the like.

Figure 6:
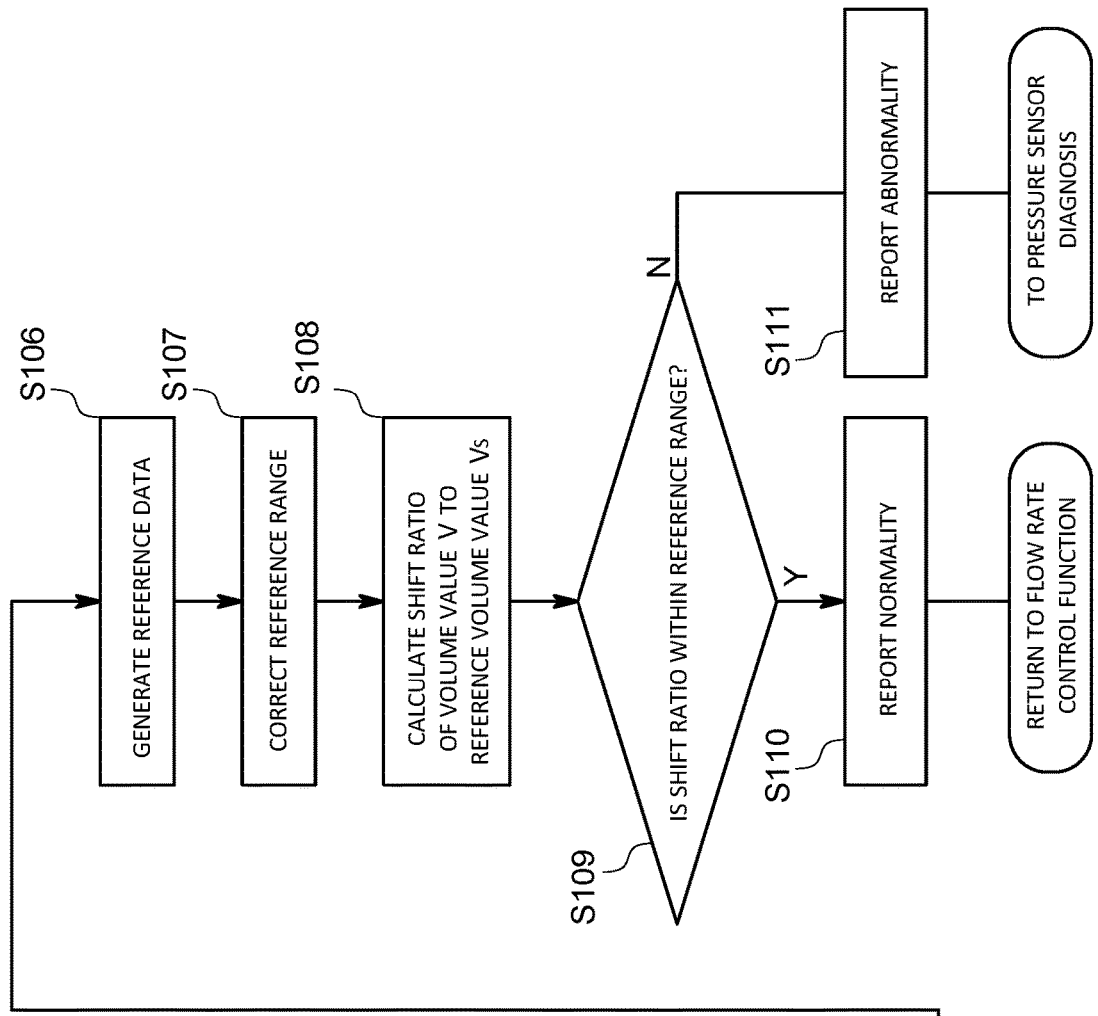
FIG. 6 is a flowchart illustrating a diagnostic process for a flow rate sensor of the flow rate controller according to the first embodiment.
Figure 6:
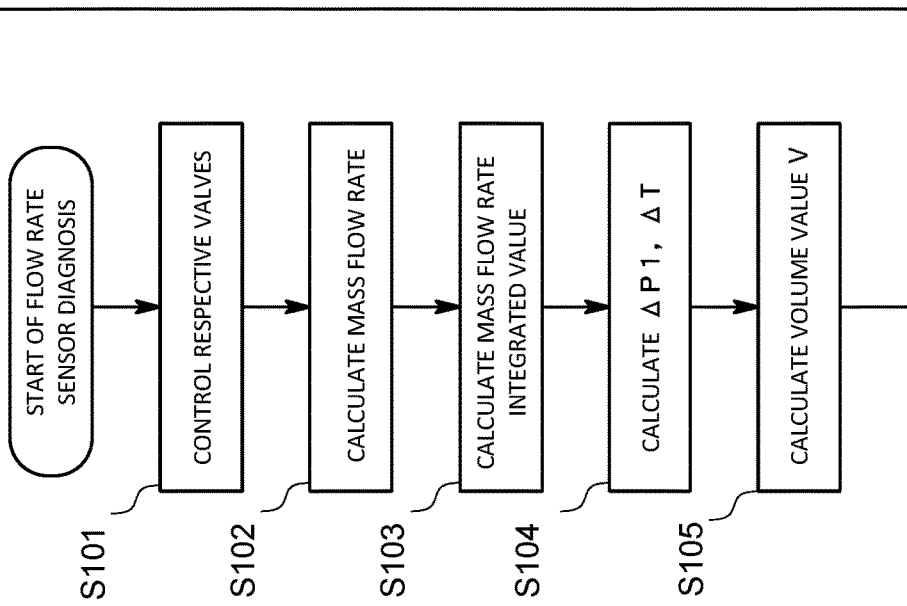

Next, a diagnostic process for the flow rate sensor 20 in the flow rate controller according to the present embodiment will be described on the basis of FIG. 6.

First, when a flow rate sensor diagnostic instruction is inputted through the input/output means, and before starting diagnosis, when a pressure measured by the upstream side pressure sensor 60 is lower than a start pressure ($P1_{START}$), the pressure is raised so as to exceed the start pressure.

Then, on the basis of the flow rate sensor diagnostic instruction, the valve control part 90c fully closes the valve of the flow rate control mechanism 30 fulfilling the flow rate control function, and also opens the on-off valves UV and DV (Step S101).

After that, when the valve of the flow rate control mechanism 30 is brought into a fully closed state, the downstream side of the flow rate controller MF1 is evacuated and depressurized by the evacuation pump, and the pressure inside the flow path temporally changes.

Subsequently, the output related-value measurement part 90d calculates a mass flow rate Q from pressure values detected by the respective pressure sensors 60 and 70 using Expression (1) above (Step S102), and then by time-integrating the mass for rate Q over the predetermined time, a mass flow rate integrated value n is calculated (Step S103). Further, on the basis of pressure values detected by the upstream side pressure sensor 60 at the start and end of the predetermined time, a pressure change amount ΔP1 is calculated, and a temperature value T detected by the temperature sensor 80 is obtained (Step S104). Still further, a measured volume value V is calculated from the mass flow rate integrated value n, the pressure change amount ΔP1, and the temperature value T using Expression (4) (Step S105). From this series of calculation, it can be said that the mass flow rate integrated value n is a value based on a pressure integrated value.

After that, the correction part 90g generates measurement data in which the measured volume value V and a measurement ambient condition at the time of the measurement of the measured volume value V are related to each other (Step S106). Then, the correction part 90g refers to reference data and the measurement data to calculate the deviation between a measurement ambient condition in the reference data and the measurement ambient condition in the measurement data, and in consideration of the deviation between the measurement ambient conditions, correct a threshold value defining the upper limit of the shift ratio of the measured volume value V to a reference volume value $V_S$ (Step S107). In doing so, a reference value is corrected.

Finally, the deviation calculation part 90h calculates the shift ratio of the measured volume value V to the reference volume value $V_S$ (Step S108), and the flow rate sensor diagnostic part 90i determines whether the shift ratio exceeds the corrected threshold value (Step S109). After that, when the shift ratio does not exceed the corrected threshold value, the diagnostic result output part 90n reports that the flow rate sensor 20 is normal in its function and continuously usable (Step S110), whereas when the shift ratio exceeds the corrected threshold value, the diagnostic result output part 90n reports that the flow rate sensor 20 is abnormal in its function (Step S111).

Note that as a result of diagnosing the flow rate sensor 20, when the flow rate sensor 20 is determined to be normal, the flow rate controller MF1 returns to the flow rate control function, whereas when the flow rate sensor 20 is determined to be abnormal, a diagnostic process for the pressure sensors 60 and 70 is subsequently performed.

In the diagnostic process for the flow rate sensor, by substituting the respective parameters (specifically, the pressure change value ΔP1, the temperature value T, the mass flow rate integrated value n, and the like) into Expression (4) derived using the state equation, the volume value V (internal volume) is calculated, and using the volume value V, it is determined whether the function of the flow rate sensor is abnormal. However, as a result of further study, the inventor has found that a parameter not appearing in the state equation also affect the calculation of the volume value V.

Specifically, the inventor has found the following facts. When pressure on the downstream side of the resistor 50, in other words, the secondary pressure of the flow rate controller MF1 is increased as a result of performing Step S101 above, the differential pressure between the upstream side and the downstream side of the resistor 50 is decreased due to the increased secondary pressure. Correspondingly, a pressure fall time is shortened, and as a result, the integration time (predetermined time) for the mass flow rate integrated value n is shortened to decrease the number of times of sampling the mass flow rate Q for calculating the mass flow rate integrated value n. This makes it easy to cause an error in the volume value V. Further, the error in the volume value V affects the accuracy of diagnosing the flow rate sensor.

Therefore, by providing a correction part (diagnostic criterion correction part) adapted to, when the differential pressure generated between the upper and lower streams of the fluid becomes equal to or less than a predetermined value, make a correction to increase the measured output-related value or make a correction to decrease the reference value to thereby tighten a diagnostic criterion for the flow rate sensor 20, the entire system incorporating the flow rate controller MF1 can be prevented from being damaged by misdiagnosis by the flow rate controller MF1. Note that this correction may be made by the correction part 90g or by the correction part (diagnostic criterion correction part) different from the correction part 90g.

Figure 7:
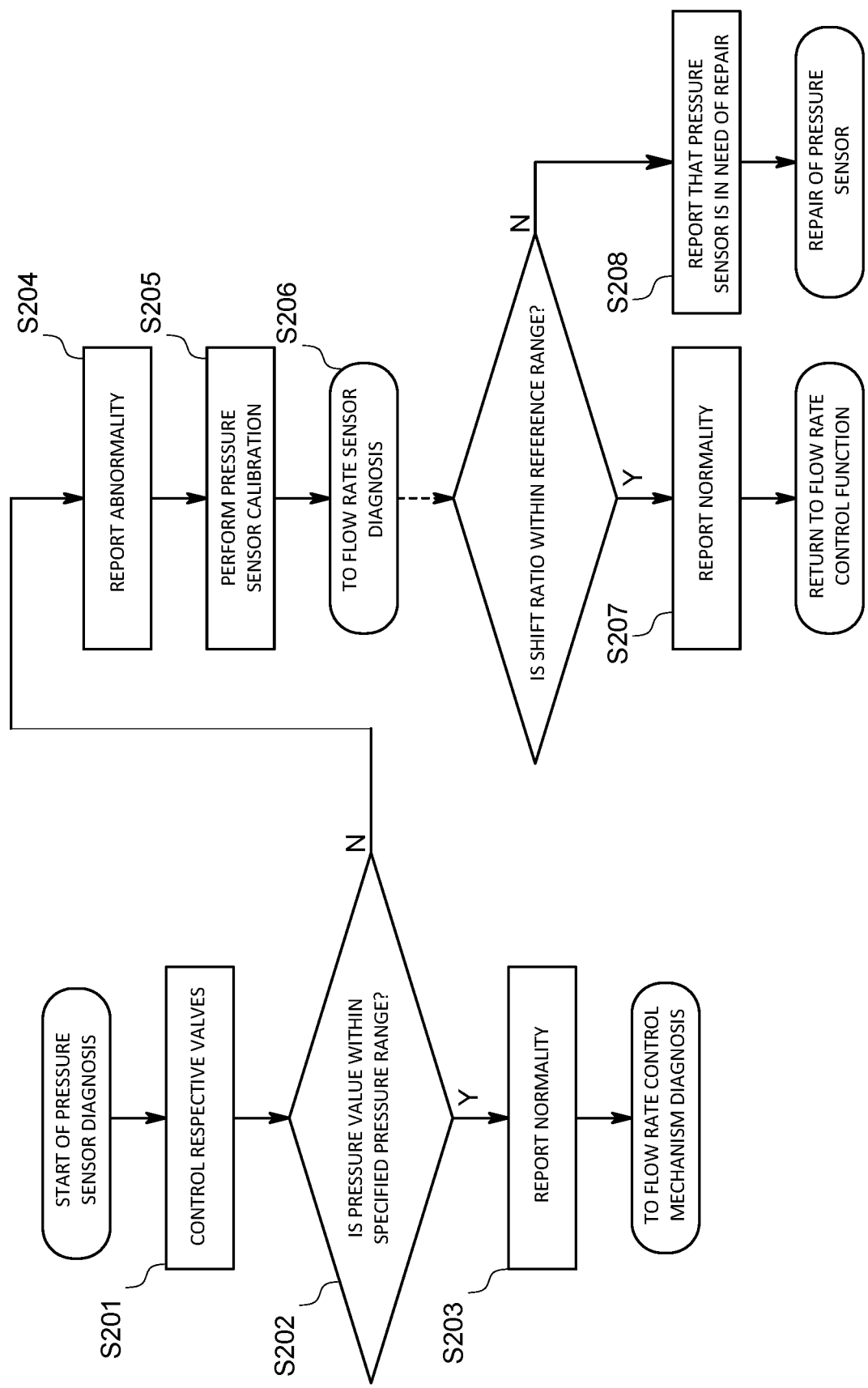
FIG. 7 is a flowchart illustrating a diagnostic process for pressure sensors of the flow rate controller according to the first embodiment.

Next, the diagnostic process for the pressure sensors in the flow rate controller according to the present embodiment will be described on the basis of FIG. 7.

When the flow rate sensor 20 is diagnosed to be abnormal and the pressure sensor diagnostic instruction is inputted through the input/output means, the valve control part 90c fully closes the on-off valve UV and also opens the valve of the flow rate control mechanism 30 and the on-off valve DV on the basis of the instruction (Step S201). Then, the pressure sensor diagnostic part 90j diagnoses whether pressure values measured by both the pressure sensors 60 and 70 are within the specified pressure range (Step S202). After that, when the pressures are within the specified pressure range, the diagnostic result output part 90n reports that the pressure sensors 60 and 70 are normal (Step S203), whereas when the pressures are not within the specified pressure range, the diagnostic result output part 90n reports that the pressure sensors 60 and 70 are abnormal (S204).

Note that when the pressure sensors 60 and 70 are diagnosed to be normal, the below-described diagnostic process for the flow rate control mechanism 30 is subsequently performed. On the other hand, when the pressure sensors 60 and 70 are diagnosed to be abnormal, and the pressure sensor calibration instruction is inputted through the input/output means, the pressure sensor calibration part 90k makes the zero-point corrections of both the pressure sensors 60 and 70 in a state where the pressure values measured by both the pressure sensors 60 and 70 are a predetermined pressure value or less (Step S205). Subsequently, the flow rate sensor 20 is again diagnosed (Step S206). Then, when the flow rate sensor 20 is diagnosed to be normal, the diagnostic result output part 90n reports the diagnostic result, and then the flow rate controller MF1 returns to the flow rate control mechanism (Step S207). On the other hand, when the flow rate sensor 20 is diagnosed to be abnormal, the diagnostic result output part 90n reports that the pressure sensors 60 and 70 have abnormalities in need of repair (Step S208).

Figure 8:
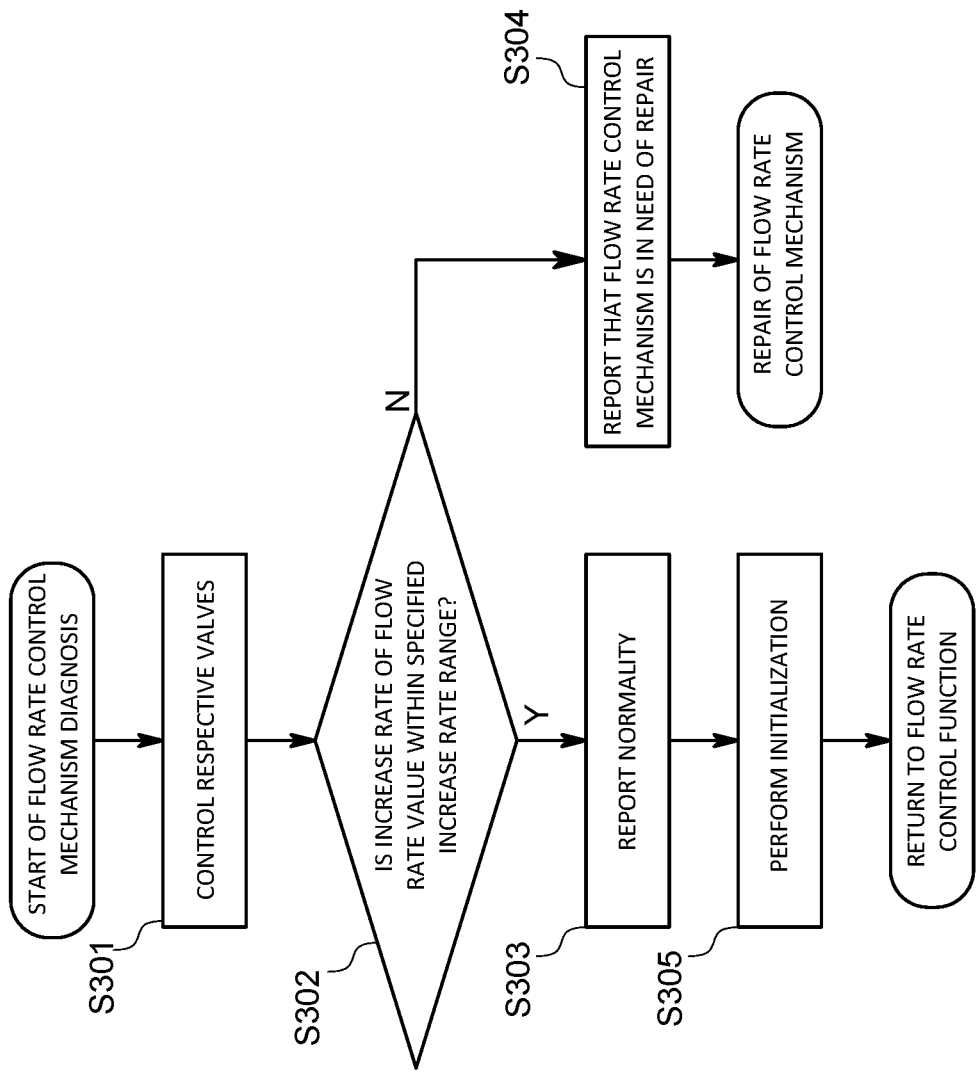
FIG. 8 is a flowchart illustrating a diagnostic process for a flow rate control mechanism of the flow rate controller according to the first embodiment.

Next, the diagnostic process for the flow rate control mechanism 30 in the flow rate controller MF1 according to the present embodiment will be described on the basis of FIG. 8.

First, when after the flow rate sensor 20 has been diagnosed to be abnormal, the pressure sensors 60 and 70 are diagnosed to be normal, and the flow rate control mechanism diagnostic instruction is inputted through the input/output means, the valve control part 90c fully closes the valve of the flow rate control mechanism 30 and also opens the on-off valves UV and DV on the basis of the instruction (Step S301). Then, the flow rate control mechanism diagnostic part 90l diagnoses whether the increase rate of a flow rate value measured by the flow rate measurement part 90a is within the specified increase rate range (Step S302). Then, when the increase rate is within the specified increase rate range, the diagnostic result output part 90n reports that the flow rate control mechanism 30 is normal (Step S303), whereas when the increase rate is not within the specified increase rate range, the diagnostic result output part 90n reports that the flow rate control mechanism 30 has an abnormality in need of repair (Step S304). The abnormality of the flow rate control mechanism 30 is highly likely to be valve seat leakage.

Note that when the flow rate control mechanism 30 is diagnosed to be normal, an initialization is subsequently performed (Step S305). The initialization is performed in such a manner that when the initialization instruction is inputted through the input/output means, the initialization performing part 90m overwrites reference data stored in the reference output-related value storage part 90e with new reference data in which a reference volume value $V_S'$ remeasured under another measurement ambient condition and the measurement ambient condition are related to each other, and further, on the basis of the new reference data, resets a threshold value stored in the reference value storage part 90f. In doing so, when the amount of leakage occurring in the valve of the flow rate control mechanism 30 is at a level not affecting the functions of the flow rate controller MF1, the flow rate controller MF1 can be continuously used without being replaced. Then, the flow rate controller MF1 returns to the flow rate control function.

Meanwhile, after the initialization of the flow rate controller MF1 has been performed, the flowrate sensor 20 is again diagnosed, and when the flow rate sensor 20 is diagnosed to be abnormal, it can be determined that an abnormality occurs in the function of the flow rate sensor due to a factor other than the pressure sensors 60 and 70 and the flow rate control mechanism 30. In addition, as the factor, the clogging of the resistor 50, leakage from the flow path 10, the inconsistency between gas specifications for the flow rate controller MF1 and actual gas specifications, or the like is conceivable.

Since every time the initialization is performed, a reference value is sequentially replaced with a reference value after the initialization, it is preferable to include: a reference value change amount calculation part adapted to calculate the change amount of a reference value after the initialization with respect to a reference value first stored (set) in the reference value storage part 90f; a reference value change amount determination part adapted to determine whether the change amount exceeds a predetermined specified change amount; and a warning part adapted to, when the change amount exceeds the predetermined specified change amount, make a report. Note that the specified change amount refers to the upper limit value of the change amount of the reference value after the initialization with respect to the first set reference value, and the upper limit value can be derived on the basis of the shift ratio of an output-related value to a reference output-related value, which is calculated from the maximum value of a valve seat leakage amount preliminarily guaranteed for the flow rate control mechanism 30. Also, when the initialization is performed multiple times, a total change amount from the first stored reference value is a change amount after the last initialization.

By configuring as described above, the respective elements of the flow rate controller MF1, which cannot be determined only by diagnosing the flow rate sensor 20, can be sequentially diagnosed, and elements considered as factors for an abnormality of the flow rate sensor 20 can be narrowed. In doing so, the possibility of overlooking abnormalities that can be coped with by some means such as calibration, repair, or replacement can be reduced to reduce the likelihood of misdiagnosis.

Note that in the present embodiment, a user manually inputs each instruction through the input/output means to perform it, but may store a program storing each instruction timing in the memory, and in accordance with the program, automatically perform each instruction.

Also, the present embodiment diagnoses the function of the flow rate sensor 20 after the calibration of the pressure sensors 60 and 70, but may be adapted to diagnose and calibrate, not only the pressure sensors 60 and 70, but also the temperature sensor 80 or other such sensors in the same manner. That is, it is only necessary to include a fluid sensor for measuring the fluid and a diagnostic part adapted to measure an output value of the fluid sensor or an output-related value that a value related to the output value, and diagnose a function of the fluid sensor by comparing the measured output-related value with a predetermined reference value, and the diagnostic part only has to be is configured to correct part or all of elements of the fluid sensor and then compare the measured output-related value and the reference value. Note that the fluid sensor is a flow rate sensor and the elements of the flow rate sensor include any of a pressure sensor and a temperature sensor. Also, in this case, it may be configured that the fluid sensor is a flow rate sensor, a flow rate control mechanism adapted to control the flow rate of the fluid by a valve on the basis of a flow rate value measured by the flow rate sensor is further included, depressurization is performed with the valve of the flow rate control mechanism closed, and the state of the valve of the flow rate control mechanism is diagnosed on the basis of whether the change rate of the flow rate value measured by the flow rate sensor is within a specified increase rate range.

Further, in the present embodiment, the valve control part 90c included in the flow rate controller MF1 controls the respective valves on the basis of each instruction inputted through the input/output means. However, without limitation to this, the respective valves may be adapted to be controlled by a valve control part included in a controller provided outside the flow rate controller MF1.

OTHER EMBODIMENTS

Figure 9:
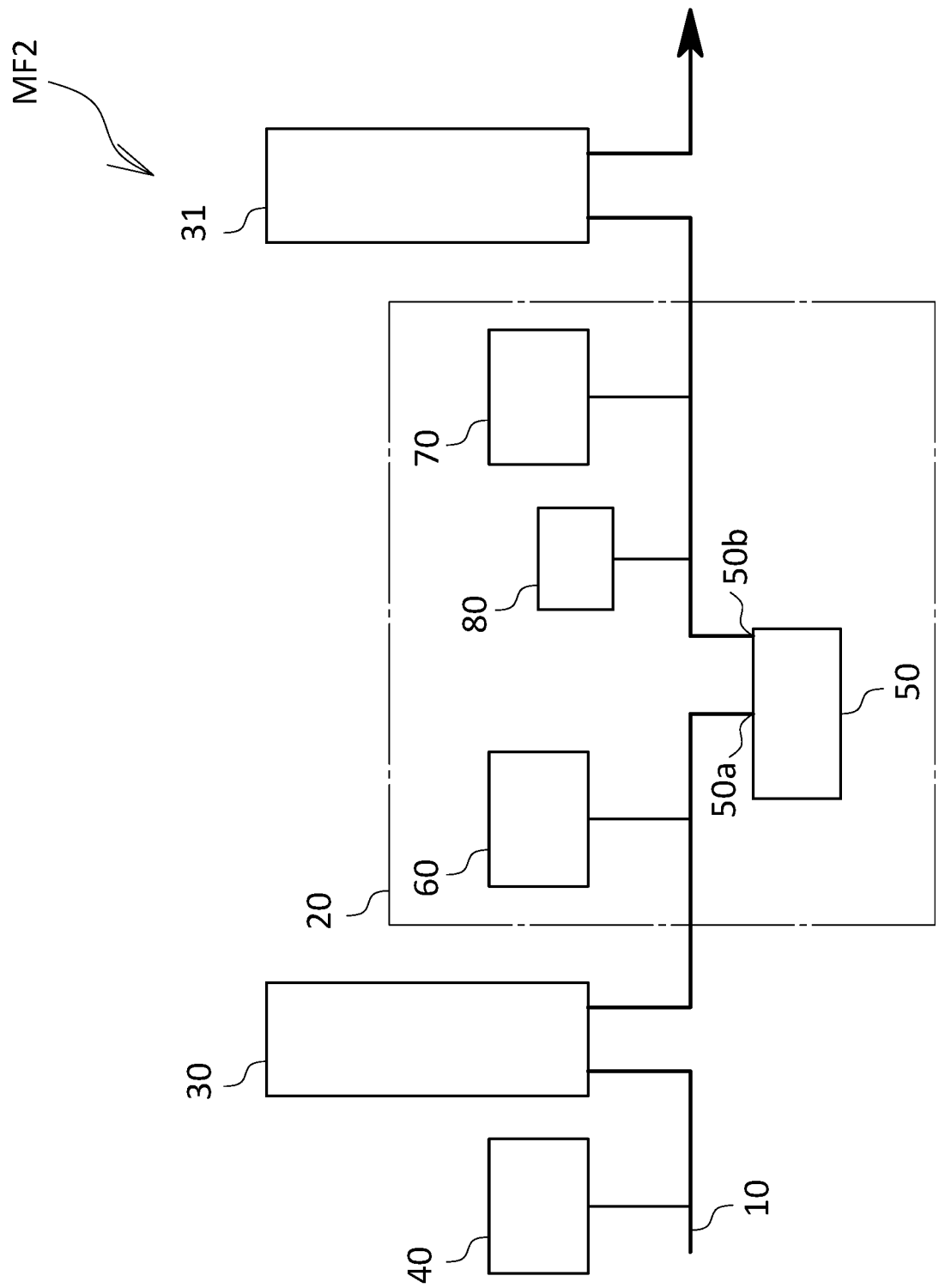
FIG. 9 is a schematic view illustrating a flow rate controller according to a second embodiment.

As another embodiment, a flow rate controller MF2 illustrated in FIG. 9 is a variation of the flow rate controller MF1 of the first embodiment, in which an on-off valve 31 is provided on the downstream side of the flow rate sensor 20, and the temperature sensor 80 is provided between the resistor 50 and the on-off valve 31. Such a flow rate controller MF2 is capable of ROR type diagnosis. Specifically, when diagnosing the function of the flow rate sensor 20, by continuously supplying the gas with the on-off valve 31 closed, the pressure of the upstream side of the on-off valve 31 is increased. Even in this case, a differential pressure is generated between the upstream side and the downstream side of the resistor 50, and therefore the volume value V between the resistor 50 and the on-off valve 31 can be calculated on the basis of measured values by the respective sensors 60, 70, and 80, thus making it possible to diagnose the function of the flow ate sensor 20 using the volume value V. Note that in this embodiment, it is necessary to change a reference value in consideration of, as a measurement ambient condition, a change in primary pressure or temperature caused by a pipe and external devices connected to the upstream side of the flow rate sensor 20.

Also, as a still another embodiment, conceivable is a configuration adapted to, in the flow rate controller MF1 of, in particular, the first embodiment, in place of both the pressure sensors 60 and 70, provide a differential pressure sensor for measuring the differential pressure between the upstream side and the downstream side of the resistor 50. Such a configuration makes it possible to reduce the effect of nozzles of the pressure sensors and reduce cost, and can be further preferably used even for a fluid whose pressure varies. Note that the flow rate controller MF1 of the first embodiment is connected with a vacuum chamber such as the deposition chamber on the secondary side, and can therefore obtain a flow rate on the primary side from a measured value by the differential pressure sensor with the secondary side as a reference (zero).

Note that the above embodiments are adapted to perform diagnosis on the basis of whether the shift ratio of the calculated volume value V to the reference volume value $V_S$ exceeds the threshold value, but without limitation to this, may perform diagnosis on the basis of the shift of the volume value V with respect to the reference volume value $V_S$. In this case, it is only necessary to set an upper or lower limit value with the reference output-related value as a reference, and use the upper or lower limit value as the reference value. Also, the above embodiments are adapted to correct the reference value on the basis of the deviation between a measurement ambient condition in measured data and the measurement ambient condition in the reference data, but may be correct an output-related value in the measurement data. Further, the above embodiments are adapted to, when calculating the volume value V, use the pressure change amount between the start and end of the predetermined time and a temperature value, but may use a flow rate change amount.

Also, in the above embodiment, as the measurement ambient condition, the pressure or temperature of the fluid is exemplified. However, the condition is not limited to this, for example, as a measurement ambient condition causing an error in the volume value V in diagnosis in the above embodiments, in addition to the above-described secondary pressure or temperature, a shift in the reference point of each pressure sensor, the clogging of the resistor, a seat leakage of the flow rate control mechanism, and the like are conceivable. Accordingly, the reference value may be adapted to be corrected depending on each of these measurement ambient conditions.

Further, in the above embodiments, the flow rate sensor includes the temperature sensor. However, the flow rate sensor is only required to have a configuration necessary to measure a flow rate, and a sensor not directly involved in the measurement of a flow rate, like the temperature sensor, is not necessarily required to be included in the flow rate sensor. In addition, the temperature sensor only has to be provided as a sensor necessary to measure the measurement ambient condition, separately from the flow rate sensor.

Note that, in addition to being applicable to the flow rate controller or a pressure controller as with the above embodiments, the diagnostic system according to the present invention is also applicable to a flow rate measurement device. Also, the fluid sensor according to the present invention is not limited to the flow rate sensor used in the above embodiment, but can also use a pressure sensor, a temperature sensor, or the like.

LIST OF REFERENCE CHARACTERS

MF1: Flow rate controller
UV, DV: On-off valve
10: Flow path
20: Flow rate sensor
30: Flow rate control mechanism
40: Pressure sensor
50: Resistor
60: Upstream side pressure sensor
70: Downstream side pressure sensor
80: Temperature sensor
90: Control part
90e: Reference output-related value storage part
90g: Correction part
90i: Flow rate sensor diagnostic part

The invention claimed is:

1. A diagnostic system comprising:
a flow rate sensor for measuring a flow rate of fluid, the flow rate sensor including a resistor, an upstream side pressure sensor arranged upstream of the resistor, a downstream side pressure sensor arranged downstream of the resistor, and a flow rate measurement part executable by a processor and configured to calculate the flow rate of the fluid;
a first valve arranged upstream of the upstream side pressure sensor;
a volume of a flow path that is from the first valve to the resistor, the pressure of which is measured by the upstream side pressure sensor; and
a controller including the processor, the processor being configured to execute an output-related value measurement part, a reference value storage part, a correction part, and a diagnostic part, wherein
the output-related value measurement part is configured to measure a measured volume value that indicates a size of the volume of the flow path on a basis of a flow rate integrated value that is a time integrated value of the flow rate for a predetermined time during which an upstream side pressure measured by the upstream side pressure sensor temporally changes, the upstream side pressure that is measured by the upstream side pressure sensor at a starting timing and an end timing of a time-integral of the flow rate integrated value, and a gas state equation set to target the volume of the flow path,
the reference value storage part is configured to store a threshold value that is determined based on a reference volume value that is preliminarily measured under a measurement ambient condition serving as a reference in order to determine whether the measured volume value is normal,
the correction part is configured to correct at least one of the measured volume value and the threshold value in accordance with the downstream side pressure that is measured by the downstream side pressure sensor on a downstream side of the volume of the flow path between the first valve and the resistor, and
the diagnostic part is configured to diagnose the flow rate sensor on a basis of the measured volume value and the reference volume value, at least one of which is reflected with a correction result by the correction part.

2. The diagnostic system according to claim 1, wherein
the processor is configured to execute a reference volume value storage part configured to store the reference volume value preliminarily measured under the measurement ambient condition serving as the reference and at least the downstream side pressure that is measured by the downstream side pressure sensor and is one of the measurement ambient condition in relation to each other, wherein
the correction part corrects at least one of the measured volume value or the threshold value according to a deviation between the downstream side pressure that is measured by the downstream side pressure sensor and is one of the measurement ambient condition related to the measured volume value and the downstream side pressure that is measured by the downstream side pressure sensor and is one of the measurement ambient condition related to the reference volume value.

3. The diagnostic system according to claim 1, wherein
the time integrated value is a time integrating a mass flow rate calculated on a basis of the upstream side pressure and the downstream side pressure.

4. The diagnostic system according to claim 3, wherein
the measured volume value is calculated from a pressure change amount during the predetermined time and one of a temperature and temperature change amount during the predetermined time and from the flow rate integrated value.

5. The diagnostic system according to claim 4, further comprising:
a second valve arranged downstream of the resistor and adapted to block a flow of the fluid, wherein
the second valve blocks the flow of the fluid to thereby temporally change pressure of the fluid in the volume of the flow path.

6. The diagnostic system according to claim 1, wherein
the correction part is configured to increase the measured volume value or decrease the threshold value as a correction in a case that a differential pressure between the upstream side pressure and the downstream side pressure becomes less than a predetermined value.

7. A flow rate sensor diagnostic method adapted to diagnose a function of a flow rate sensor of a flow rate controller that comprises the flow rate sensor for measuring a flow rate of fluid and a first valve, the flow rate sensor including a resistor, an upstream side pressure sensor arranged upstream of the resistor, a downstream side pressure sensor arranged downstream of the resistor, and a flow rate measurement part executable by a processor and configured to calculate the flow rate of the fluid, the first valve being arranged upstream of the upstream side pressure sensor, the diagnostic method comprising:
measuring a measured volume value that indicates a size of a volume of a flow path on a basis of a flow rate integrated value that is a time integrated value of the flow rate for a predetermined time during which an upstream side pressure measured by the upstream side pressure sensor temporally changes, the upstream side pressure that is measured by the upstream side pressure sensor at a starting timing and an end timing of a time-integral of the flow rate integrated value, and a gas state equation set to target the volume of the flow storing a threshold value that is determined based on a reference volume value that is preliminarily measured under a measurement ambient condition serving as a reference in order to determine whether the measured volume value is normal;

correcting at least one of the measured volume value and the threshold value in accordance with a downstream side pressure that is measured by the downstream side pressure sensor on a downstream side of the volume of the flow path between the first valve and the resistor; and diagnosing the flow rate sensor on a basis of the measured volume value and the reference volume value, at least one of which is reflected with a result of the correction.

8. A flow rate controller comprising:

a flow rate sensor for measuring a flow rate of fluid, the flow rate sensor including a resistor, an upstream side pressure sensor arranged upstream of the resistor, a downstream side pressure sensor arranged downstream of the resistor, and a flow rate measurement part executable by a processor and configured to calculate the flow rate of the fluid;

a first valve arranged upstream of the flow rate sensor and adapted to control the flow rate of the fluid on a basis an output value of the flow rate sensor;

a volume of a flow path that is from the first valve to the resistor, the pressure of which is measured by the upstream side pressure sensor; and a controller including the processor, the processor being configured to execute an output-related value measurement part, a reference value storage part, a correction part, and a diagnostic part, wherein the output-related value measurement part is configured to measure a measured volume value that indicates a size of the volume of the flow path on a basis of a flow rate integrated value that is a time integrated value of the flow rate for a predetermined time during which an upstream side pressure measured by the upstream side pressure sensor temporally changes, the upstream side pressure that is measured by the upstream side pressure sensor at a starting timing and an end timing of a time-integral of the flow rate integrated value, and a gas state equation set to target the volume of the flow path, the reference value storage part is configured to store a threshold value that is determined based on a reference volume value that is preliminarily measured under a measurement ambient condition serving as a reference in order to determine whether the measured volume value is normal, the correction part is configured to correct at least one of the measured volume value and the threshold value in accordance with the downstream side pressure that is measured by the downstream side pressure sensor on a downstream side of the volume of the flow path between the first valve and the resistor, and the diagnostic part is configured to diagnose the flow rate sensor on a basis of the measured volume value and the reference volume value, at least one of which is reflected with a correction result by the correction part.

9. A diagnostic system comprising:

a flow rate sensor for measuring a flow rate of fluid, the flow rate sensor including a resistor, an upstream side pressure sensor arranged upstream of the resistor, a downstream side pressure sensor arranged downstream of the resistor, and a flow rate measurement part executable by a processor and configured to calculate the flow rate of the fluid;

a first valve arranged downstream of the downstream side pressure sensor;

a volume of a flow path that is from the resistor to the first valve, the pressure of which is measured by the downstream side pressure sensor; and a controller including the processor, the processor being configured to execute an output-related value measurement part, a reference value storage part, a correction part, and a diagnostic part, wherein the output-related value measurement part is configured to measure a measured volume value that indicates a size of the volume of the flow path on a basis of a flow rate integrated value that is a time integrated value of the flow rate for a predetermined time during which a downstream side pressure measured by the downstream side pressure sensor temporally changes, the downstream side pressure that is measured by the downstream side pressure sensor at a starting timing and an end timing of a time-integral of the flow rate integrated value, and a gas state equation set to target the volume of the flow path, the reference value storage part is configured to store a threshold value that is determined based on a reference volume value that is preliminarily measured under a measurement ambient condition serving as a reference in order to determine whether the measured volume value is normal, the correction part is configured to correct at least one of the measured volume value and the threshold value in accordance with the upstream side pressure that is measured by the upstream side pressure sensor on an upstream side of the volume of the flow path between the resistor and the first valve, and the diagnostic part is configured to diagnose the flow rate sensor on a basis of the measured volume value and the reference volume value, at least one of which is reflected with a correction result by the correction part.

* * * * *